United States Patent [19]
Jordil

[11] Patent Number: 6,072,318
[45] Date of Patent: *Jun. 6, 2000

[54] CAPACITIVE DEVICE FOR MEASURING DIMENSION

[75] Inventor: Pascal Jordil, Ecoteaux, Switzerland

[73] Assignee: Brown & Sharpe Tesa S.A., Renens, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/948,459

[22] Filed: Oct. 10, 1997

[30] Foreign Application Priority Data

Oct. 11, 1996 [EP] European Pat. Off. .............. 96810686

[51] Int. Cl.$^7$ .................................................. G01R 27/26
[52] U.S. Cl. .......................................... 324/660; 324/662
[58] Field of Search .................................... 324/660, 690, 324/725, 662; 340/870.37

[56] References Cited

U.S. PATENT DOCUMENTS

| | | | |
|---|---|---|---|
| 4,437,055 | 3/1984 | Meyer | 324/725 |
| 4,449,179 | 5/1984 | Meyer | 324/725 |
| 4,743,838 | 5/1988 | Eckerle | 324/660 |
| 4,743,902 | 5/1988 | Andermo | 324/660 |
| 4,878,013 | 10/1989 | Andermo | 324/690 |
| 5,225,830 | 7/1993 | Andermo | 324/13 |
| 5,394,096 | 2/1995 | Meyer | 324/686 |

FOREIGN PATENT DOCUMENTS

| | | |
|---|---|---|
| 184584 | 6/1986 | European Pat. Off. . |
| 421131 | 4/1991 | European Pat. Off. . |
| 543421 | 5/1993 | European Pat. Off. . |
| 622612 | 11/1994 | European Pat. Off. . |
| 3438234 | 5/1985 | Germany . |
| 3740544 | 6/1989 | Germany . |
| 648929 | 4/1985 | Switzerland . |

*Primary Examiner*—Josie Ballato
*Assistant Examiner*—Jose M. Solis
*Attorney, Agent, or Firm*—Jacobson, Price, Holman & Stern, PLLC

[57] ABSTRACT

Double-emitting and multiple-receiving capacitive measuring device: it comprises a scale equipped with an array of electrodes and a transducer, which moves parallel to and opposite the scale and is equipped with two emitting electrodes and an array of receiving electrodes distributed into N groups. The capacitive coupling between the different electrodes allows the position of the transducer to be determined. A generator emits two emission signals (E0, E1) in phase opposition on the two emitting electrodes of the transducer. The frequency of generated emission signals (E0, E1) depends upon the speed of displacement of the transducer. Processing means determine a dimension with the aid of N signals (R0, R7) received on the receiving electrodes. The more significant bits of the result are provided by a primary counting system using a first algorithm. The less significant bits are provided by a secondary precision system using a second algorithm.

16 Claims, 4 Drawing Sheets

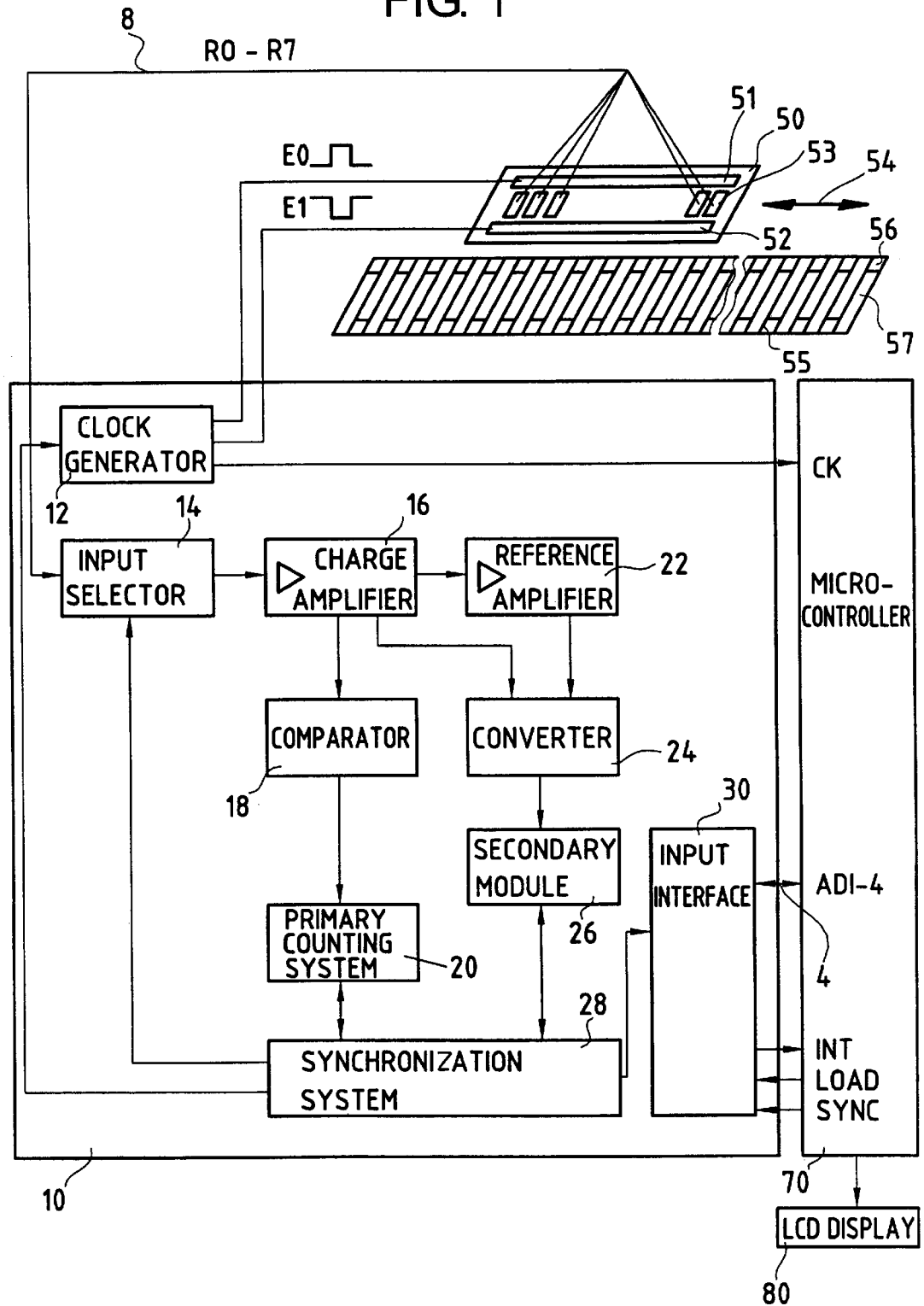

| R0 > R4 | R1 > R5 | R2 > R6 | R3 > R7 |   |
|---------|---------|---------|---------|---|
| 1       |         |         | 0       | 0 |
|         |         | 1       | 1       | 1 |
|         | 0       | 0       |         | 2 |
| 1       | 1       |         |         | 3 |
| 0       |         |         | 1       | 4 |
|         |         | 0       | 0       | 5 |
|         | 1       | 1       |         | 6 |
| 0       | 0       |         |         | 7 |

# 6,072,318

CAPACITIVE DEVICE FOR MEASURING DIMENSION

BACKGROUND OF THE INVENTION

1. Field of the Invention

This invention concerns a capacitive device for measuring dimension.

2. Description of the Related Art

Capacitive measuring devices are used in precision measuring instruments, for example in calipers or in height measuring columns. They generally comprise a scale and a transducer, both equipped with electrodes. The capacitive coupling between the different electrodes changes when the transducer is displaced opposite the scale. The value of this coupling or its evolution is assessed, and allows the position of the transducer to be determined.

It would be possible for the position to be determined with just a single electrode on the transducer being displaced opposite a single electrode on the scale. When the two electrodes are perfectly superimposed, the capacitive coupling is maximal. If the transducer is displaced, the coupling diminishes. The displacement of the transducer can thus be determined by measuring this coupling.

To increase the resolution and to render the system less sensitive to errors, particularly positioning errors, the use of arrays of several electrodes is generally preferred, both on the scale and on the transducer. Depending upon the configuration adopted, the majority of these devices can be grouped into two main types.

The first main type concerns multiple emitting and simple receiving systems. The patent document EP 0 184 584 (Mauser Werke Oberndorf) describes a system of this type. In this system, the transducer bears three groups of emitting electrodes which receive AC signals mutually phase shifted by 120°, for example sinusoidal signals. These signals are transmitted capacitively to scale electrodes, then, in return, to two receiving electrodes on the transducer. The signal obtained on these two electrodes is then converted by analyzing means into a result indicating the position of the transducer.

The patent documents U.S. Pat. No. 4,743,902 (Andermo), U.S. Pat. No. 4,878,013 (Andermo), U.S. Pat. No. 4,449,179 (Meyer) and U.S. Pat. No. 4,437,055 (Meyer) describe variant systems using multiple emission of N signals and simple reception on one or two electrodes.

These devices require the generation of N signals, for example N phase-shifted sinusoidal signals. The precision in measurement generally depends upon the precision in phase shift between the N signals obtained. If N is large, and depending upon the shape of the desired signals, design of the N signal generator is difficult and a large surface of integrated circuit is required.

EP 0 622 612, of which the present applicant is the patent holder, describes a variant of this type of system, measuring the change in frequency of signal received rather than its phase for determining the position of the transducer. This system is thus less sensitive to errors in phase. However, this system also requires a complex N signal generator.

The second main type among capacitive measuring devices are the simple emitting and multiple receiving systems. Such a system is disclosed, for example, in the Swiss patent CH 648 929, of which the present applicant is the patent holder. In these systems, a single signal is emitted on a sole emitting electrode. N electrodes or groups of receiving electrodes on the transducer receive N different signals, for example mutually phase-shifted signals. The N signals received are then analyzed to determine the position of the transducer.

SUMMARY OF THE INVENTION

The present invention concerns an improvement in capacitive measuring devices of this second type.

According to the invention, this improvement is achieved through a capacitive device for measuring dimension comprising:

a scale equipped with an array of scale electrodes, a transducer able to be displaced parallel to and facing the scale and equipped with m=2 emitting electrodes and n receiving electrodes, said scale electrodes being capacitively coupled to said m=2 emitting electrodes and to said n receiving electrodes, the coupling between electrodes depending upon the position of the transducer, the n receiving electrodes being connected electrically in such a way as to form N groups of mutually connected electrodes, N being an integer greater or equal to two, a generator generating m=2 emission signals in phase opposition on the emitting electrodes, processing means determining with the aid of N measuring signals received on the N groups of receiving electrodes a numerical result representing the position of the transducer along the scale.

Although a system of double emission of signals and multiple reception is described in U.S. Pat. No. 4,743,838 (FIG. 2), the solution uses receiving electrodes of sinusoidal shape, and the precision in measurement depends very closely upon the precision with which the electrodes are made. This document does not suggest dividing the receiving electrodes into groups of mutually connected electrodes, nor emitting signals in phase opposition. This system therefore does not attain a high resolution and a high level of precision in measurement.

The present invention enables a high resolution and a high level of precision to be obtained in a system having little sensitivity to mechanical positioning errors. Moreover the invention allows these advantages to be achieved with a device of simple construction, in particular an emission signal generator of simple construction, the device having minimal electricity consumption.

Only differential signals are emitted on the transducer. Thus no ground connection is necessary. In the prior art, these connections had to be realized with particular care, and a large printed circuit surface was required. The invention therefore enables the manufacture and mounting of the transducer to be simplified.

Use of a differential measuring system moreover permits reduction of sensitivity to interference, in particular electrical and electromagnetic interference.

BRIEF DESCRIPTION OF THE DRAWINGS

The invention will be better understood with the aid of the description of a preferred embodiment illustrated by the attached figures, in which:

FIG. 1 is an overall diagram of the device according to the invention incorporating an integrated control circuit;

DETAILED DESCRIPTION OF THE PREFERRED EMBODIMENTS

Figure 2A:
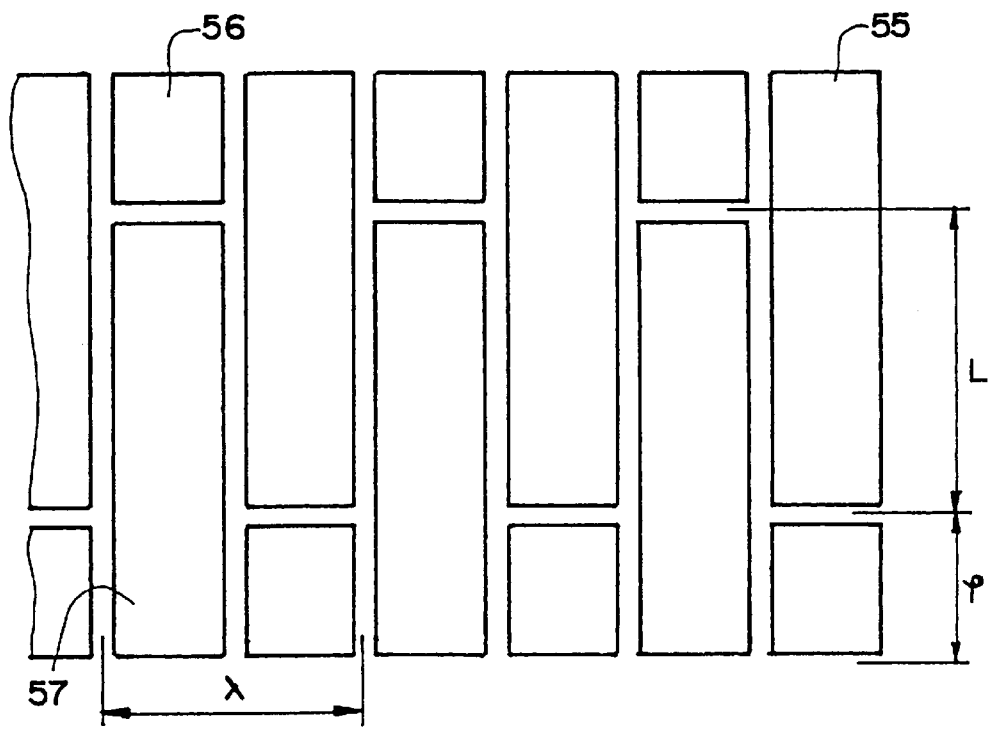
FIG. 2A is a view from above of the scale electrodes.

FIG. 1 represents a block diagram of the assembly of the device according to the invention. It comprises a capacitive transducer 50 able to be displaced above a capacitive scale 55 (as shown by arrows 4). The scale is equipped with an array of parallel scale electrodes 56 and 57 (FIG. 2A). The adopted arrangement of scale electrodes in this example is i-shaped. Each scale segment of length $\lambda$ is provided with two short electrodes 56 and two long electrodes 57. The length of electrodes 57 equals L whereas the length of electrodes 56 equals $\phi$. The width of the two types of electrodes is slightly less than $\lambda/2$. The short electrodes are disposed alternately above and below the long electrodes, as illustrated. The scale electrodes are floating and are insulated with respect to one another. They are deposited, for example, by metallization on a substrate of glass or a printed circuit board. In a variant, the scale can also be made using printed circuit manufacturing technology.

Other arrangements of scale electrodes, for example disposed in a T as described in EP 0 184 584 or in an L, can also be adopted.

Figure 2B:
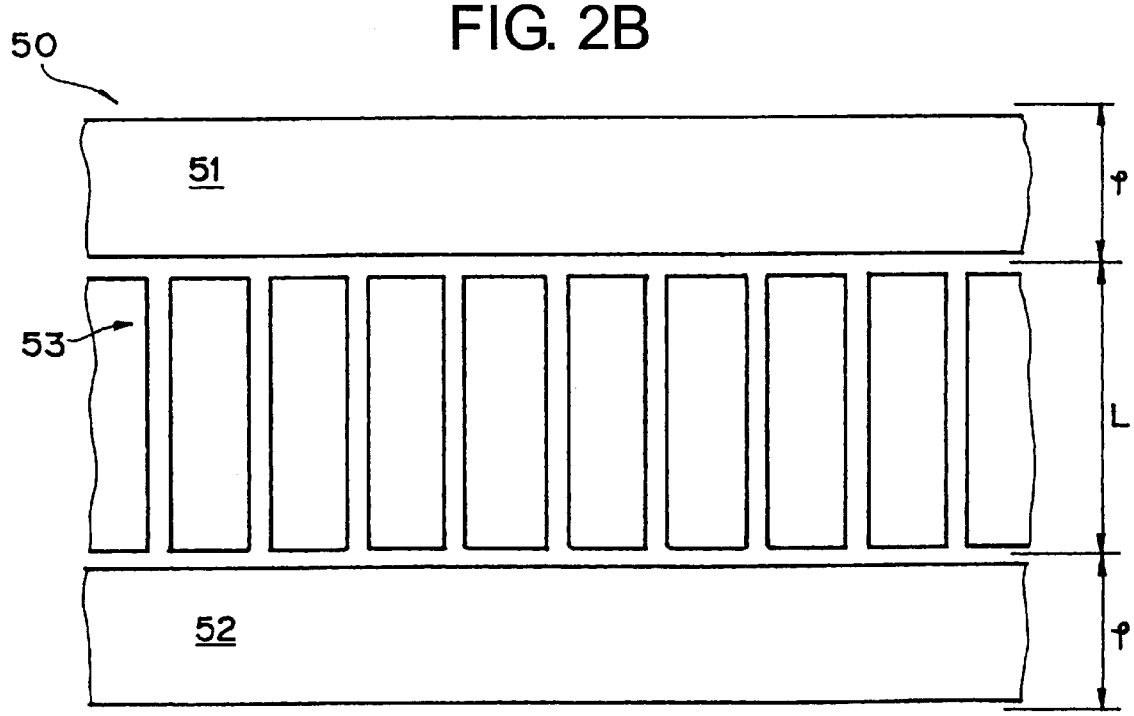
FIG. 2B is a view from above of the transducer electrodes.

The capacitive transducer bears two emitting electrodes 51 and 52 and a series of receiving electrodes 53 (FIG. 2B). The emitting electrodes 51, 52 extend on each side on a portion at least as long as that occupied by the array of parallel receiving electrodes 53. The width of the emitting electrodes 51, 52 equals $\phi$ whereas that of the receiving electrodes 53 equals L.

The n receiving electrodes 53 are connected electrically to one another at the back of the transducer in such a way as to form N groups of electrodes, in this example 8 groups R0 to R7. A group of electrodes is formed by several electrodes occupying positions such that all the electrodes of the group receive signals of identical phase regardless of the position of the transducer above the scale. In FIG. 2B, the successive electrodes 53 belong respectively to groups 0, 1, 2, 3, 4, 5, 6, 7, 0, 1, 2, 3, 4, 5, 6, 7, and so on. An identical sequence of electrodes thus repeats itself periodically. However, other more sophisticated arrangements can also be adopted, for example, a distribution in groups of the type described in U.S. Pat. No. 4,878,013 (Andermo) or in U.S. patent application Ser. No. EP 08/659,671, filed in the name of the present applicant (now U.S. Pat. No. 5,977,781), the content of which is incorporated herein by reference.

The transducer 50 is made, for example, with a printed circuit board on which the transducer electrodes are etched out. It is also possible to use a ceramic substrate. One part of the processing electronics, not shown in this figure, can be placed directly on this board. In a variant which allows very fine and very precise electrodes to be obtained, the transducer electrodes can be made directly on the surface of an integrated circuit implementing the processing electronics.

A portion of at least each of the scale electrodes faces one of the m=2 emitting electrodes. In addition, when the transducer 50 is placed above the scale 55, the two emitting electrodes 51 and 52 cover several successive electrodes 56, 57 of the scale. In this way, the signal emitted on the emitting electrodes 51, 52 is transmitted capacitively to receiving electrodes 56, 57 below the transducer. The signal thus collected is transmitted directly to the central part of the scale electrodes 57 of the long type. These central portions of the electrodes 57 polarize, in return, the receiving electrodes 53 placed above, on the transducer. The capacitive coupling between the electrodes 57 and 53 depends on the surface of overlapping, and thus on the relative position of the transducer along the scale.

When the transducer is displaced, the resulting capacitive coupling between the scale electrodes 57 and the N groups of receiving electrodes 53 is a periodic function depending on the variation of the surface of overlapping. With the adopted arrangement of electrodes, the contribution of two emitting electrodes E0, E1 on the receiving electrodes varies in phase opposition: when the capacitive coupling between a receiving electrode 53 and the first emitting electrode 51 increases, the coupling between that electrode 53 and the second emitting electrode 52 decreases in an inversely proportional way. The emitted signals E0 and E1 have an opposite polarity; consequently, the signal R0–R7 received on each receiving electrode comes partly from E0 and partly from E1 emitted in phase opposition. This arrangement permits in particular compensation of the pivoting of the transducer about its longitudinal axis.

Figure 3:
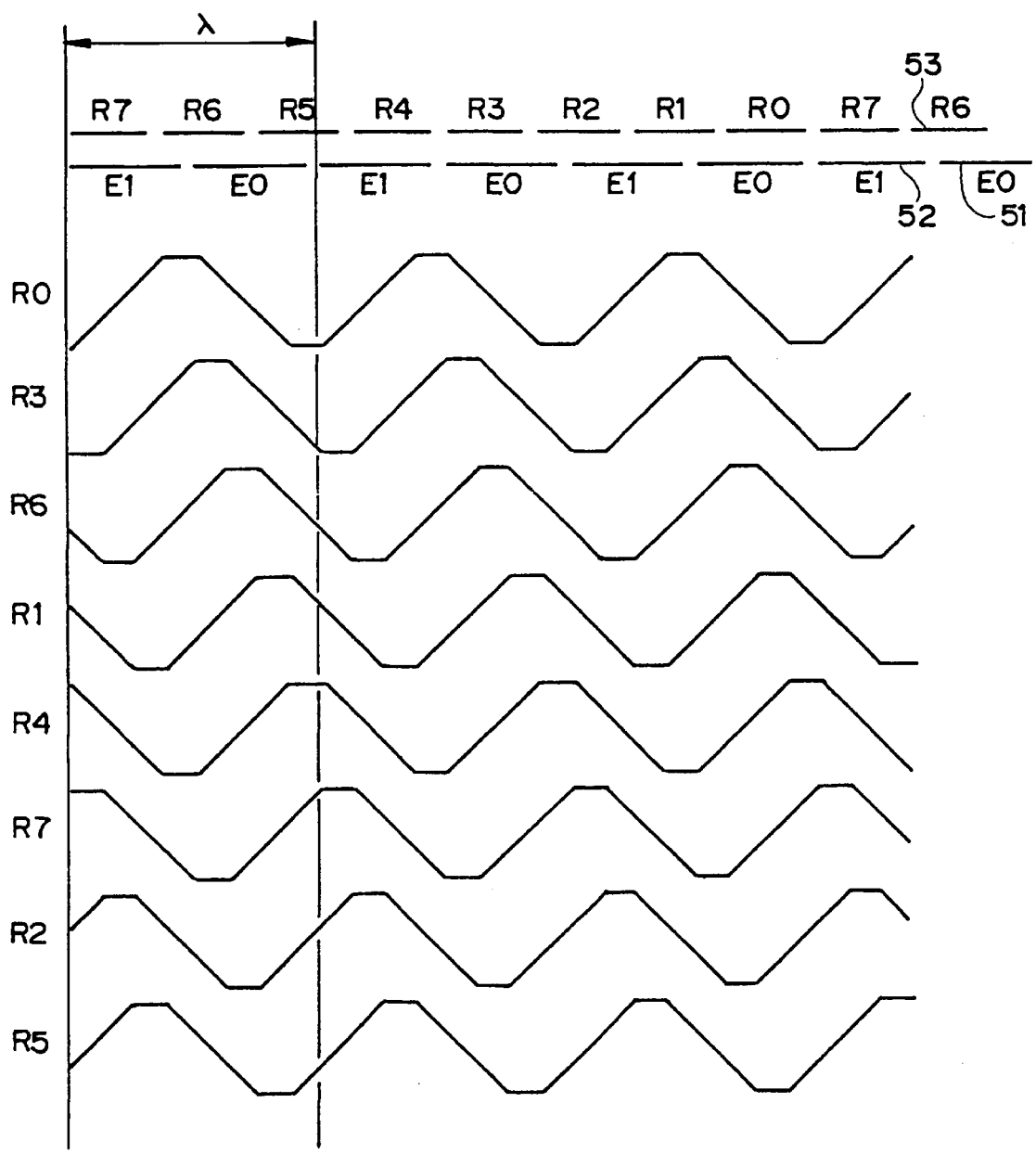
FIG. 3 is a diagram showing the signal received on the different receiving electrodes as a function of the position of the transducer.

In a preferred variant, emitted signals E0 and E1 are of rectangular form and the flanks are used. In this case, the amplitude of signals R0 to R7 received on the N groups varies proportionally to the variation of capacitance. FIG. 3 represents this variation of signals R0 to R7 as a function of the position of the transducer 50.

By considering the signals R0 to R7 in a non-sequential order:

$$R(i+1)=[R(i)+3] \text{MOD } N \text{ with } N=8 \text{ in this example}$$

these signals form a system in which the phase progresses regularly by 45° from one group to the following. The system is periodic with one k period equal to the width occupied by 2 scale electrodes 57.

Coming back to FIG. 1, the device according to the invention further comprises a control circuit 10, a microcontroller 70 and a liquid crystal display 80. The function of the control circuit 10 is essentially to generate the signals E0 and E1 intended for the emitting electrodes 51 and 52, and to process the signals R0–R7 received on the N=8 groups of receiving electrodes 53 so as to determine a numerical result representing the position of the transducer. The microcontroller 70 controls the functioning of the circuit 10, certain auxiliary functions such as stand-by mode, and controls the LCD display 80 on which the measurement results are displayed.

The control circuit 10 has a clock generator 12 which delivers all the frequencies necessary for the internal functioning of the circuit as well as a clock signal CK intended for the micro-controller 70. Moreover, the clock generator generates the signals E0 and E1 intended for the emitting electrodes of the transducer 51 and 52. As indicated above, the signals E0 and E1 are rectangular signals in phase opposition. Their generation is thus very easy; it is possible, for example, to obtain E1 simply by placing an inverter on the line E0.

According to one feature of the invention, the number of flanks of signals E0, E1 generated per unit of time is a function of the speed of displacement of the transducer 50. For this purpose, the clock generator is connected to the synchronization circuit 28, described further below. The synchronization system informs the clock generator 12 about the speed of displacement of the transducer. The frequency of generated flanks is a function of this information: when the transducer 50 is displaced rapidly, more flanks are generated than when it remains stationary. This feature takes advantage of limited maximal accelerations of the system to generate only the minimum of flanks necessary to keep the position of the transducer, and thus reduce the power consumption.

In a variant, the generation of flanks can also be controlled by the microprocessor 70 and depends, for example, on the state of the batteries of the system, on the desired maximal reading speed, etc.

The signals collected on the receiving electrodes 53 of the transducer 50 are gathered in N=8 groups in the way described above. The corresponding 8 signals R0–R7 are provided at the input of an input selector 14 in the integrated circuit 10.

Figures 4, 5:
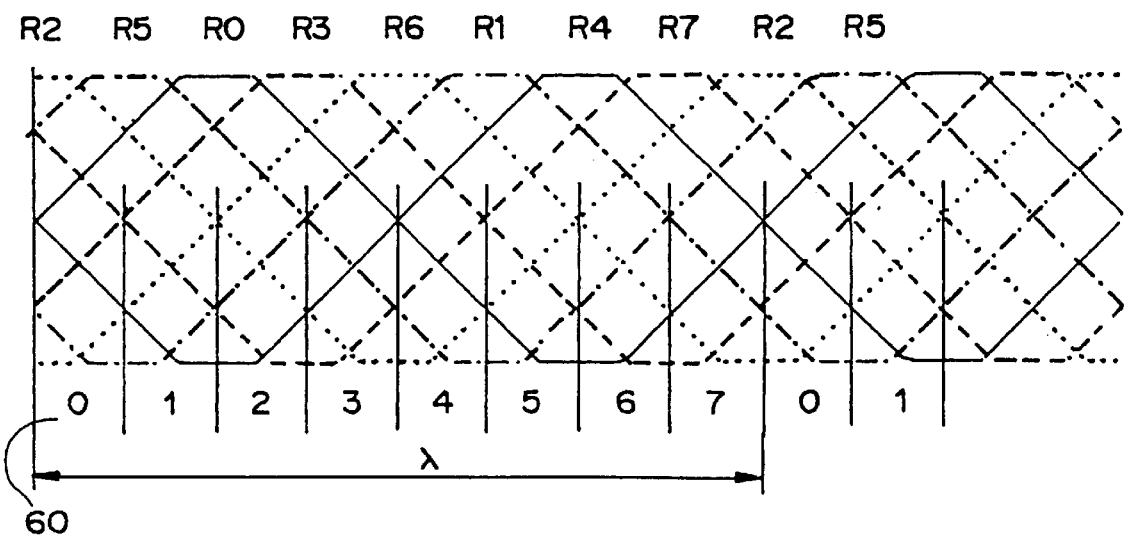
FIG. 4 is a table indicating the zone in which the transducer is located as a function of the results of a comparison of signals on the receiving electrodes.
FIG. 5 illustrates, in superposition, the signal received on the different receiving electrodes as a function of the position of the transducer.

FIG. 5 illustrates in superposition the receiving signals R0–R7 as a function of the position of the transducer. This diagram corresponds to eight superimposed diagrams of FIG. 3. The period of variation, which is identical for the N=8 inputs, has been broken down into N=8 zones of identical width, numbered 0 to 7. It can be seen that in each zone only four channels are to be found in their usable linear position, the four other channels being saturated. As a function of the zone indications provided by the synchronization system 28, or by the primary counting system 20 and, the input selector 14 selects the usable four channels and connects the other four channels with the ground.

The table below indicates the usable channels in each zone:

| Zone | Channels |
|------|----------|
| 0 | 0, 4, 7, 3 |
| 1 | 3, 7, 2, 6 |
| 2 | 6, 2, 5, 1 |
| 3 | 1, 5, 0, 4 |
| 4 | 4, 0, 3, 7 |
| 5 | 7, 3, 6, 2 |
| 6 | 2, 6, 1, 5 |
| 7 | 5, 1, 4, 0 |

If, as in this example, the clock generator 12 sends rectangular signals on the emitting electrodes 51, 52, the signal collected on the electrodes 53 is pulse-shaped (charges on the electrodes). A charge amplifier 16 connected to the outout of the selector 14 converts these charges into voltages.

A comparator 18 connected to the output of the charge amplifier 16 compares the four selected channels to one another and thus determines three bits indicating the zone 60 in which the transducer is located. In a general way, the number of bits thus determined is equal to $\log_2(N)$. FIG. 4 is a table whose last column indicates the zone number as a function of comparisons. In this table, a 1 signifies that the comparison indicated in the column heading is verified. The voids indicate comparisons which have not been made, the corresponding channels not being selected.

The primary module 20 uses the results furnished by the comparator 18 to stablish the zone 60 in which the transducer is located. Since this system is periodical, the results of the comparator 18 repeat themselves as soon as the transducer has displaced itself a distance $\lambda$. To eliminate this ambiguity, the primary system 20 incorporates a counter (not shown) which counts, for example, the crossovers to zero of one of the measuring signals R0 to R7, taking into account the direction of displacement, to determine the absolute position of the transducer.

The primary module 20 provides the output interface 30 with 14 bits indicating the position of the transducer 50 with a precision of $\lambda/N$. The 11 high order bits are determined by the counter; the 3 low order bits indicate the zone according to the results of the comparator 18.

The charge amplifier 16, the comparator 18 and the primary module 20 for an assembly designated in the following and in the claims as the primary counting system 16, 18, 20.

To increase the precision, the system incorporates further a secondary precision system constituted by the modules 22, 24 and 26. To reduce power consumption, this secondary system is not used continuously. A control signal coming from the micro-controller 70 allows disconnection of the secondary precision system when the precision provided by the primary system is sufficient at the particular moment. In a variant, the secondary precision system can be disconnected by the synchronization system 28 when the speed of displacement of the transducer, determined by the primary precision system, surpasses a certain threshold.

The secondary precision system allows the position of the transducer to be determined precisely within the zone determined by the primary counting system. To achieve optimal precision, the four usable channels (far from saturation) are used in each zone to determine the position. The signal corresponding to these four channels is amplified by the reference amplifier 22 and is furnished to an analog-to-digital conversion element 24.

The reference voltage which feeds the converter 24 is not fixed, but is the result of the reference amplifier 22, and has the value:

$$a-b+c-d$$

At the input, the analog-to-digital converter receives the voltage a−b. In this way the digital output of the converter 24 corresponds to the numerical equivalent of $$r = \frac{a-b}{a-b+c-d}$$

The table below defines the channels a, b, c, d to be used in each zone:

| Zone | Channel a | Channel b | Channel c | Channel d |
|------|-----------|-----------|-----------|-----------|
| 0 | R0 | R4 | R7 | R3 |
| 1 | R3 | R7 | R2 | R6 |
| 2 | R6 | R2 | R5 | R1 |
| 3 | R1 | R5 | R0 | R4 |
| 4 | R4 | R0 | R3 | R7 |
| 5 | R7 | R3 | R6 | R2 |
| 6 | R2 | R6 | R1 | R5 |
| 7 | R5 | R1 | R4 | R0 |

It can be noted that at the beginning of each zone, the signal of channels a and b is identical whereas channels c and d are equal at the end of each zone. In these two cases, the previously mentioned expression becomes:

$$r(a=b)=0 \text{ at the beginning of the zone}$$

and $$r(c=d)=1 \text{ at the end of the zone}$$

This algorithm has the following advantages:
- compensation of errors in amplitude: if all the signals are attenuated by an identical factor k, the result remains unchanged;
- compensation of slope errors;
- use of maximum information available in each zone;
- avoidance of any division operations (difficult to achieve both in analog and in digital).

In the example, the converter 24 is a converter providing 12 bits to the secondary module 26. These 12 bits are then furnished to the synchronization system 28, and will considerably increase the resolution of the measuring system.

The data of the primary 20 and secondary 26 modules are provided to the synchronization system 28, which ensures the synchronization between the primary system and the secondary system, in particular when the transducer changes zones. When the transducer changes zones transient errors can arise, which must be avoided, for example cases where the primary system has already taken into account the change of zone but the secondary system has not.

Thus it is the synchronization system 28 which has the complete control of operations, and which determines at each instant in which zone the transducer is located. Depending on the zone, the system 28 orders the input selector 14 to select the appropriate inputs.

The synchronization system further comprises a module (not shown) allowing the momentary speed of displacement of the transducer to be determined. This information is used in particular to control the clock generator 12 so that it generates more flanks when the speed of displacement of the transducer is relatively fast than when the transducer is stationary. Moreover, this information could also be used to disconnect the secondary precision system beyond a certain displacement speed or after a certain duration of immobility. The object of reducing to a minimum the electricity consumption of the circuit is thus well achieved.

The 14 bits coming from the primary system and the 12 bits coming from the secondary system, united in a single word of 26 bits (FIG. 5), are furnished to the output interface 30. This interface transmits these 26 bits to the micro-controller 70 in an appropriate form. In this example, the 26 bits are transmitted in pseudo-serial form on four mixed lines (data and addresses). The signs INT, LOAD and SYNC allow synchronization of changes of data between the control circuit 10 and the micro-controller 70.

One skilled in the art will understand that many indicated elements of the device can be realized either in the form of software or in the form of a circuit. For example, certain functions of the secondary precision system could be executed by the micro-controller 70 using software means. However, integration of the secondary system in the circuit 10 makes it possible to use a very simple micro-controller 70, thus one which is economical and has low power consumption. Moreover, as mentioned in the foregoing, the integrated secondary system 22, 24, 26 can be disconnected when the supplementary bits which it provides are not used or are not significant, which allows electricity consumption to be reduced.

Furthermore, it is evident that the number N of groups can differ from 8, and thus could be, for example, 6, 10 or 12. If the number is different, it will of course be necessary to adapt accordingly the tables which have been given, by way of example, in the specification and in the figures.

One skilled in the art will understand moreover that the receiving electrodes 53 on the transducer do not necessarily all have the same surface; electrodes of variable shape and/or of variable surface can be chosen, which allows compensation of certain types of geometrical errors.

What is claimed is:

1. A capacitive device for measuring dimension comprising:
   a scale equipped with an array of scale electrodes,
   a transducer able to be displaced parallel to and facing the scale and equipped with m=2 emitting electrodes and n receiving electrodes, said scale electrodes being arranged so when they are facing said transducer, a portion at least of each of said scale electrodes faces one of said m=2 emitting electrodes so that each of said scale electrodes is capacitively coupled to one of said emitting electrodes, and further being arranged so an area of said array of scale electrodes faces said receiving electrodes so that each receiving electrode is capacitively coupled with at least one of said scale electrodes, the coupling between said scale electrodes and said receiving electrodes depending upon the position of the transducer, said scale electrodes forming a substantially parallel arrangement in said area of the array which faces said receiving electrodes, and neighboring electrodes in said area being capacitively coupled to different emitting electrodes, the n receiving electrodes being connected electrically in such a way as to form N groups of mutually connected electrodes, N being an integer greater than or equal to two,
   a generator generating m=2 emission signals in phase opposition on the emitting electrodes,
   processing means determining with the aid of the relative values of N measuring signals received on the N groups of receiving electrodes a numerical result representing the position of the transducer along the scale, wherein said processing means comprises a primary counting device that provides the high order bits of the numerical result with the aid of a first algorithm and a secondary precision device providing the low order bits of the numerical result with the aid of a second algorithm, and the N measuring signals form a system in which the phase progresses regularly by $\lambda/N$ from one measuring signal to another.

2. The capacitive device according to claim 1, wherein said generator generates emissions signals having a frequency responsive to the speed of displacement of the transducer.

3. The capacitive device according to claim 1, wherein said secondary precision device can be deactivated, for example when the speed of displacement of the transducer surpasses a predetermined threshold.

4. The capacitive device according to claim 1, wherein the primary counting device incorporates a counter that counts the crossovers to zero of at least one of the measuring signals to determine the high order bits of the numerical result, the resolution provided by said high order bits corresponding to the pitch of the scale electrodes.

5. The capacitive device according to claim 1, wherein the primary counting device incorporates means of comparison permitting the measurement signals to be compared to one another in order to determine the intermediate order bits of the numerical result, the resolution provided by said intermediate order bits corresponding to a zone the width of which is equal to the pitch (λ) of scale electrodes divided by N.

6. The capacitive device according to claim 1, further comprising an input selector allowing selection of a sub-set of signals from among the N measuring signals as a function of the state of the primary counting device.

7. A method for measuring dimension with a capacitive device comprising the steps of:

providing a scale equipped with an array of scale electrodes, providing a transducer able to be displaced parallel to and facing the scale and equipped with m=2 emitting electrodes and n receiving electrodes, said scale electrodes being capacitively coupled to the m=2 emitting electrodes and to the n receiving electrodes, the coupling between electrodes depending upon the position of the transducer, the n receiving electrodes being connected electrically in such a way as to form N groups of mutually connected electrodes, N being an integer greater than or equal to two and smaller than n, generating m=2 emission signals in phase opposition on the emitting electrodes, determining with the aid of N measuring signals received on the N groups of receiving electrodes a numerical result representing the position of the transducer along the scale, wherein said step of determining includes a primary counting system able to provide the high order bits of the numerical result with the aid of a first algorithm and a second precision system able to provide the low order bits of the numerical result with the aid of a second algorithm, wherein the primary counting system permits the measurement signals to be compared to one another in order to determine the intermediate order bits of the numerical result, the resolution provided by said intermediate order bits corresponding to a width equal to the pitch (λ) of scale electrodes divided by N, and wherein the secondary precision system is able to determine the low order bits of the result by evaluating the expression $$\frac{a-b}{a-b+c-d}$$

in which a and b correspond to values taken by two measuring signals chosen such that a=b at the beginning of said zone determined by the primary counting system, and c and d to values taken by two measuring signals different from a and b and chosen such that c=d at the end of said zone, the four chosen signals a, b, c, d being chosen such that they are in their linear region in the entire said zone.

8. A capacitive device for measuring dimension comprising:

a scale equipped with an array of scale electrodes, a transducer able to be displaced parallel to and facing the scale and equipped with m=2 emitting electrodes and n receiving electrodes, said scale electrodes being arranged so when they are facing said transducer, a portion at least of each of said scale electrodes faces one of said m=2 emitting electrodes so that each of said scale electrodes is capacitively coupled to one of said emitting electrodes, and further being arranged so an area of said array of scale electrodes faces said receiving electrodes so that each receiving electrode is capacitively coupled with at least one of said scale electrodes, the coupling between said scale electrodes and said receiving electrodes depending upon the position of the transducer, said scale electrodes forming a substantially parallel arrangement in said area of the array which faces said receiving electrodes and neighboring electrodes in said area being capacitively coupled to different emitting electrodes, the n receiving electrodes being connected electrically in such a way as to form N groups of mutually connected electrodes, N being an integer greater than or equal to two, a generator generating m=2 emission signals in phase opposition on the emitting electrodes, processing means determining with the aid of the relative values of N measuring signals received on the N groups of receiving electrodes a numerical result representing the position of the transducer along the scale, wherein said processing means comprises a primary counting device that provides the high order bits of the numerical result with the aid of a first algorithm and a secondary precision device providing the low order bits of the numerical result with the aid of a second algorithm, wherein said secondary precision device determines the low order bits of the result by evaluating the expression $$\frac{a-b}{a-b+c-d}$$

in which a and b correspond to values taken by two measuring signals chosen such that a=b at the beginning of said zone determined by the primary counting system, and c and d to values taken by two measuring signals different from a and b and chosen such that c=d at the end of said zone, the four chosen signals a, b, c, d being chosen such that they are in their linear region in the entire said zone.

9. The capacitive device according to claim 5, wherein the number N is either 6, 8, 10 or 12.

10. The method of claim 7, wherein said step of generating comprises generating emission signals with a frequency responsive to the speed of displacement of the transducer.

11. The capacitive device according to claim 9, wherein the passing of the transducer from one zone, the width of which is equal to the pitch (λ) divided by N, to a next zone produces a change in the value of the comparison between two signals forming a first pair (a, b) of signals in phase opposition, a position of the transducer where said first pair of signals are equal (a=b) corresponding to the limit between said one zone and the next zone.

12. The method of claim 7, wherein the primary counting system counts the crossovers to zero of at least one of the measuring signals to determine the high order bits of the numerical result, the resolution provided by the high order bits corresponding to the pitch of the scale electrodes.

13. The capacitive device according to claim 11, further comprising an input selector for supplying said first pair of signals and a second pair of signals in phase opposition to the comparison means; wherein the passage of the transducer from one zone to the next further causes the input selector to disconnect said second pair of signals and to select a new pair of signals (d, c) which are phase shifted by λ/N from said first pair of signals (a, b) in such a way that said new pair of signals are equal (d=c) at the end of said next zone.

14. The capacitive device according to claim 13, wherein said second precision device determines the low order bits of the result by evaluating the expression $$\frac{a-b}{a-b+c-d}$$

in which a and b correspond to values taken by said first pair of measuring signals and c and d to values taken by said new pair of measuring signals.

15. The method of claim 7, wherein the secondary precision system can be deactivated when the speed of displacement of the transducer surpasses a predetermined threshold.

16. The method of claim 15, further comprises the step of allowing selection of a sub-set of signals from among the N measuring signals as a function of the state of the primary counting system.

* * * * *